Figure 1:
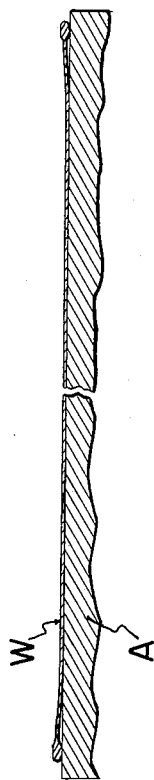

Sept. 27, 1955 K. L. KNOX 2,718,666
PROCESS OF LONGITUDINALLY STRETCHING FILM
OF ORGANIC LINEAR POLYMERIC MATERIAL
Filed Sept. 24, 1951

INVENTOR:
KENNETH L. KNOX
BY
ATTORNEY.

United States Patent Office 2,718,666
Patented Sept. 27, 1955

2,718,666

PROCESS OF LONGITUDINALLY STRETCHING FILM OF ORGANIC LINEAR POLYMERIC MATERIAL

Kenneth L. Knox, Kenmore, N. Y., assignor to E. I. du Pont de Nemours and Company, Wilmington, Del., a corporation of Delaware Application September 24, 1951, Serial No. 247,977

8 Claims. (Cl. 18—57)

This invention relates to a process of stretching a polymeric film, and more particularly, to a process of longitudinally stretching a polymeric film to enhance certain physical properties thereof and to reduce uniformly the thickness and prevent excessive reduction in the width of the film.

There are numerous synthetic linear organic polymers which are capable of being formed into translucent or transparent films having excellent physical properties. Such films are highly useful in a great variety of applications, e. g., packaging, electrical applications, protective coverings, glass replacement, fabric replacement, etc. On the other hand, certain physical properties of these films, such as tensile strength, impact strength, flex life, water vapor and organic vapor permeability, are not competitive with those of other types of films, fabrics, etc. However, in most instances, films of synthetic linear organic polymer may be drawn or stretched, i. e., elongated longitudinally and/or transversely to effect a permanent change in the molecular orientation thereof with accompanying improvements in the physical properties cited above.

A great number of improved techniques and apparatus for stretching films prepared from well known organic polymeric compositions have been developed heretofore. However, in spite of such improvements, the main problem of producing a uniformly stretched film is still encountered in known stretching techniques. A uniformly stretched film is one in which the thickness and width have been reduced uniformly. Under conditions of continuous stretching in the longitudinal direction, it is most desirable to reduce the thickness of the film to a uniform caliper while uniformly reducing the width of the film to a minimum degree.

An object of the present invention is to provide a continuous process of longitudinally stretching a polymeric film to improve the physical characteristics thereof and produce a film of uniform thickness or caliper. A further object is to provide a continuous process of stretching a film longitudinally while its widthwise dimension is reduced to only a minimum degree. A still further object is to provide a continuous process for uniform reduction in the widthwise dimension of the film while it is being longitudinally stretched. Other objects will appear more clearly from the description given hereinafter.

The above objects are realized by the present invention which, briefly stated, comprises forming from a synthetic linear organic polymeric material, a film having beaded edges formed to contact the surfaces of stretching rolls, said beaded edges being from about 0.125 to about 0.5 of an inch in width and at least twice the thickness of the main body portion of the film; and stretching said beaded film longitudinally on a series of smooth-surfaced, tension-applying rolls, while maintaining the beaded edge and the main body portion of the film for substantially its entire width in contact with the surfaces of the rolls. I have found that the longitudinal tension applied to the film apparently sets up greater friction between the stretching rolls and beaded edges of the film than exists between the main body surface of the film and the stretching rolls. This additional friction serves to prevent excessive transverse slippage or excessive "necking-in" (i. e., reduction in film width) during longitudinal stretching. Hence, by stretching a film having beaded edges, the decrease in the widthwise dimension of the film may be kept to a minimum, i. e., 10-15%; and the reduction in the thickness of the film is uniform. Furthermore, when beaded edges are not provided, the reduction in film thickness is not only irregular, but the reduction in the width of the film is both irregular and excessive, i. e., 25-30%. This irregular reduction in the width of the film is known as "scalloping"; and such a condition results not only in excessive waste necessitated by trimming, but also results in process difficulties and film breakage when the longitudinally stretched film is to be stretched in the transverse direction by means of a tenter frame apparatus.

The process of the present invention is particularly adapted, and will hereinafter be specifically described with reference to film of polyethylene terephthalate described in U. S. P. 2,465,319. The present process, however, is of broad scope and is fully applicable to films formed from various other types of synthetic linear organic polymers such as the polyamides, e. g., polyhexamethylene adipamide, polyhexamethylene sebacamide, polycaproamide, and other types described in U. S. Patents 2,071,250 and 2,071,253; vinylidene chloride; rubber hydrochloride; polystyrene; and various other polymeric materials which are stretchable at various temperatures.

In extruding a polymeric material into the form of a film, there are a number of ways that may be employed to provide film with the necessary beaded edges. For example, the beaded edge may be cast directly by using hopper lips which have openings at both ends corresponding to the shape of a cross-section of the bead. On the other hand, when using hopper lips which are readily adjustable along the entire length of the lips, the width of the opening between the hopper lips may be increased at both ends of the hopper lips. On the other hand, it should be understood that a beaded edge may be provided by merely folding the edges of the film over upon itself to provide edges which have a thicker cross-section than the film itself. Such a technique may be useful when the film is formed by calendering instead of by extrusion. Regardless of the manner in which a beaded edge is formed, the beneficial effects of providing such an edge are obtained so long as the bead is so formed that it will contact the surface of each stretching roll.

The thickness of the beaded edge must be at least twice the thickness of the film before stretching. The use of beads appreciably thicker than twice the thickness of the film before stretching is usually not necessary. Furthermore, for film which is less than 0.005" in thickness, beads greater than ten times the film thickness should not be used; and in stretching film which is greater than 0.005", the bead thickness should not be greater than five times the film caliper. Bead thicknesses greater than the aforementioned limits are impractical from the standpoint of the amount of work required to stretch excessively thick beads. Furthermore, the use of excessively thick beads results in the formation of unnecessary quantities of waste. With regard to the width of the beaded edge, a bead which is at least about 0.125" in width is satisfactory; and beads which are greater than about 0.25-0.5" are not necessary. On the other hand, the beneficial effect of a beaded edge which is substantially less than 0.125" in width is measurably reduced.

Since stretching of films of polymeric material such as polyethylene terephthalate is usually carried out at elevated temperatures, the use of highly polished stretching rolls is necessary to maintain a smooth surface on the film being stretched; and this, in turn, preserves transparency. In the case of stretching over rolls having roughened surfaces, the tendency for a film to slip transversely is lessened; but the process of the present invention is still useful in reducing the amount of transverse slip to a minimum. In general, any arrangement of rolls which operates to stretch the film longitudinally may be employed for purposes of this invention. For example, the stretching apparatus may comprise two groups of driven rolls disposed in parallel relationship; the rolls in the second group being rotated at a greater surface speed than that of the rolls in the first group. The difference in speed between the two groups of rolls determines the stretch ratio (ratio of the length of the film before stretching to the length of the film after stretching).

In some instances, it may be necessary to size the film prior to stretching to prevent sticking of the film to the surfaces of the rolls. Experience has shown that the thinner the film being stretched, the more susceptible it is to sticking to the rolls, especially film which must be stretched at elevated temperatures. This is generally true of polyethylene terephthalate film in calipers ranging from 0.001–0.005". Furthermore, the degree to which a film tends to stick to the longitudinal stretching rolls also depends upon the actual composition of the roll surface and the degree of polish. In most cases, film sticking can be avoided by treating the film prior to longitudinal stretching with a suitable sizing composition. Depending upon the chemical composition of the film, and also upon the film caliper, there are numerous well known solid and liquid sizing compositions suitable for application to the film prior to longitudinal stretching. Usually only a relatively small amount of size is necessary to prevent sticking; and, in most cases, an additional amount of a sizing composition must be added to the finished film in order not only to improve the anti-static properties, but also to improve slip and prevent matting. Excessive amounts of sizing added to a film prior to longitudinal stretching will substantially reduce the beneficial effects of following the process of the present invention; that is, excessive sizing promotes excessive transverse slippage; and the tentering action exerted by the beaded edges is greatly depreciated. Generally, when stretching a film which has a caliper greater than 0.005", a preliminary treatment with a sizing is not necessary to prevent film sticking. Various suitable sizing compositions for polyethylene terephthalate film comprise aqueous solutions containing less than about 0.03% of each of a fatty alcohol sulfate and sodium chloride (a typical composition contains an aqueous solution of 0.03% of sodium lauryl sulfate and 0.015% of sodium chloride). Solid sizing compositions which may be employed include various types of talcs.

Figure 2:
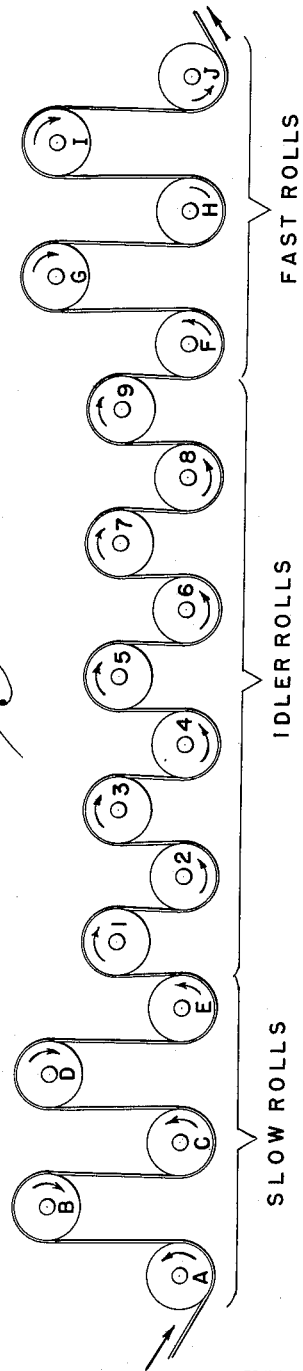

The following examples will further serve to illustrate the principles and practice of the present invention. These examples are to be read in connection with the accompanying drawing wherein:

Figure 1 is a fragmentary cross-section taken transversely of the film and a supporting roll showing beaded edges of the film, and the main body portion of the film for substantially its entire width, in contact with the surface of a stretching roll in accordance with this invention; and Figure 2 is a diagrammatic sketch of a suitable arrangement of stretching rolls.

Example I

Amorphous polymeric polyethylene glycol terephthalate prepared by ester exchange between dimethyl terephthalate and ethylene glycol in accordance with the general procedure described in U. S. P. 2,465,319 to Whinfield and Dickson, was extruded through an extrusion hopper provided with adjustable hopper lips to form a film of amorphous polymer 20" in width and 0.005" in thickness. Both ends of the lip opening of the extrusion hopper were widened to form a film W (Fig. 1) having beaded edges. The beaded edge was about ¼" wide and 0.010" in thickness.

The film was fed into a longitudinal stretching section comprised of three groups of horizontal, chromium plated, polished rolls disposed in parallel. The arrangement is illustrated in Fig. 2. The first group of five, A–E inclusive (slow rolls), were positively driven at a surface speed of 15 yards per minute and were internally heated so that the surfaces were at a temperature between 80–85° C. The next group of nine, 1–9 inclusive, were idler rolls heated to the same temperature. The last group of five, F–J inclusive (fast rolls), were positively driven at a speed of 45 yards per minute and were heated to 80–85° C. Each roll was 30" wide by 4½" in outside diameter. The distance between the circumferences of adjacent slow rolls and adjacent fast rolls was 4". The distance between the circumferences of the last slow roll and the first idler roll, the last idler roll and the first fast roll, and between adjacent idler rolls, was 0.04". As shown in Fig. 2, alternate rolls in the same group were in the same horizontal plane. The film which was stretched 3× in the longitudinal direction was of uniform caliper, and the reduction in the width of the film was about 10%. The caliper of the film was 0.0018". Furthermore, the edges of the film were substantially straight, and no "scalloping" was observed.

Example II

As an example of what happens when a film having no beads is stretched longitudinally in the above described apparatus, a sample of film 20" wide by 0.005" in thickness was extruded and fed into the apparatus described in Example I under the same stretching conditions. After longitudinal stretching, this film "necked-in" (was reduced in width) 25–30% of its original width; and the edges of the film were scalloped, which means that the width varied from 14–17". In addition, the caliper of the film was highly irregular and varied from 0.0012"–0.0028".

As mentioned hereinbefore, the friction between the beaded portion of a film and the stretching rolls is substantially greater than between the main body surface of the film and the roll surfaces. Such friction is set up by the longitudinal tension applied to the film as it moves through the longitudinal stretching rolls. Hence, it appears that the beaded edges exert a tentering action which serves to prevent excessive transverse slippage of the film during longitudinal stretching. It is evident from the foregoing discussion that such excessive transverse slippage of the film during the longitudinal stretching operation leads to the formation of film having non-uniform caliper and scalloped edges. Furthermore, at higher stretching rates, that is, above about 25–30 yards per minute, excessive "necking-in" occurs when stretching a non-beaded film. It is to be understood that several other factors taken into account in designing the stretching apparatus described hereinbefore, contribute substantially to preventing excessive "necking-in" of the film during longitudinal stretching. For example, the use of idler rolls between the slow and fast rolls aids in promoting uniform stretching of the film between the slow and fast rolls. Furthermore, it is necessary that the idler rolls be as close together as possible in order to maintain the effect of always having the film in contact with a roll surface. Excessive "necking-in" will occur, especially at high stretching rates, if the idler rolls are too far apart; the greater the distance between the idler rolls, the more opportunity the film has to "neck-in" during transfer from one roll to the other. Hence, by having the idler rolls, over which all the stretching occurs, as close together as possible, the effect of the film always being in contact with the roll surface is maintained. It is preferred that the distance between adjacent idler rolls, the distance between the last slow roll and the first idler roll, and the distance between the last idler roll and first fast roll should be no greater than 3–5 times the thickness of the film before stretching.

The process of the present invention applies only to longitudinal stretching carried out by using rolls driven at differential speeds. In the apparatus described hereinbefore, the use of a number of rolls driven positively at the same speed serves to keep the film under uniform tension and prevent longitudinal slippage. However, for the purpose of avoiding the use of a series of rolls driven at the same speed, various types of pinch rolls may be used to grip the film securely after which the film may pass directly to another pair of pinch rolls operating at a higher speed; or the film may be passed through a series of idler rolls as used in the foregoing examples.

It is evident that the process of the present invention is of particular advantage in continuous longitudinal stretching of a polymeric film. On the other hand, when the film is to be stretched in the transverse direction after longitudinal stretching, the beaded edge is of additional advantage in that it provides a satisfactory gripping ledge for the tenter clips which are used to stretch the film transversely.

As many changes may be made without departing from the spirit and scope of my invention, it is to be understood that said invention is in no way limited save as set forth in the appended claims.

I claim:

1. A process for longitudinally stretching film of synthetic, linear, organic, film-forming polymeric material which comprises shaping the longitudinal edges of the film in the form of a beading having a width of from about 0.125 to about 0.5 of an inch, and a thickness at least twice that of the main body portion of the film, and stretching said film longitudinally on and between closely spaced stretching rolls driven at differential speeds while maintaining the beaded edges of the film and the main body portion of the film for substantially its entire width in contact with the surface of said rolls and permitting said film to shrink transversely.

2. A process according to claim 1 wherein the polymeric material is amorphous polyethylene terephthalate.

3. A process according to claim 2 wherein the film is stretched at a temperature of from 80–85° C.

4. A process for longitudinally stretching film of synthetic, linear, organic, film-forming polymeric material which comprises shaping the longitudinal edges of the film in the form of a beading having a width of from about 0.125 to about 0.5 of an inch, and a thickness at least twice that of the main body portion of the film, and passing said film successively around each of a first group of parallel rolls positively driven at a constant surface speed, and thence successively around each of a second group of parallel rolls positively driven at a constant surface speed higher than the surface speed of said first group of rolls, the adjacent rolls between which the film is stretched being closely spaced while maintaining the beaded edges of the film and the main body portion of the film for substantially its entire width in contact with the surfaces of said rolls and permitting said film to shrink transversely, whereby to longitudinally stretch said film between said groups of rolls.

5. A process which comprises extruding synthetic, linear, organic, film-forming polymeric material in the form of a film having beaded longitudinal edges, said beaded edges having a width of from about 0.125 to about 0.5 of an inch, and a thickness of at least twice that of the main body portion of the film, and stretching said film longitudinally on and between closely spaced stretching rolls driven at differential speeds while maintaining the beaded edges of the film and the main body portion of the film for substantially its entire width in contact with the surface of said rolls and permitting said film to shrink transversely.

6. A process which comprises extruding synthetic, linear, organic, film-forming polymeric material in the form of a film having beaded longitudinal edges, said beaded edges having a width of from about 0.125 to about 0.5 of an inch, and a thickness of at least twice that of the main body portion of the film, and passing said film successively around each of a first group of parallel, smooth-surfaced rolls staggered in two planes and positively driven at a constant surface speed, and thence successively around each of a second group of parallel, smooth-surfaced rolls staggered in two planes and positively driven at a constant surface speed higher than the surface speed of said first group of rolls, the adjacent rolls between which the film is stretched being closely spaced, while maintaining the beaded edges of the film and the main body portion of the film for substantially its entire width in contact with the surfaces of said rolls and permitting said film to shrink transversely, whereby to longitudinally stretch said film between said groups of rolls.

7. A process according to claim 6 wherein the polymeric material is polyethylene terephthalate.

8. A process according to claim 6 wherein the rolls are maintained at a temperature of from 80–85° C., and the speed of the rolls is such that the film is stretched about 3 times its original length.

References Cited in the file of this patent

UNITED STATES PATENTS

| | | |
|---|---|---|
| 2,342,891 | Powers | Feb. 29, 1944 |
| 2,412,187 | Wiley et al. | Dec. 3, 1946 |
| 2,497,376 | Swallow et al. | Feb. 14, 1950 |